(12) United States Patent
Xia

(10) Patent No.: US 11,285,791 B2
(45) Date of Patent: Mar. 29, 2022

(54) TRANSMISSION STRETCHING TRUCK BOX COVERING DEVICE WITH HEATING CONTROL

(71) Applicant: Foshan Bestwyll Auto Accessories Co., Ltd, Foshan (CN)

(72) Inventor: Yong Xia, Foshan (CN)

(73) Assignee: Foshan Bestwyll Auto Accessories Co., Ltd, Foshan (CN)

( * ) Notice: Subject to any disclaimer, the term of this patent is extended or adjusted under 35 U.S.C. 154(b) by 0 days.

(21) Appl. No.: 17/090,917

(22) Filed: Nov. 6, 2020

(65) Prior Publication Data
US 2021/0053428 A1 Feb. 25, 2021

(30) Foreign Application Priority Data
Apr. 27, 2020 (CN) .......................... 202020662471.X

(51) Int. Cl.
*B60J 7/057* (2006.01)
*B60J 7/04* (2006.01)

(52) U.S. Cl.
CPC ............. *B60J 7/0573* (2013.01); *B60J 7/041* (2013.01)

(58) Field of Classification Search
CPC ................................ B60J 7/0573; B60J 7/041
USPC ........................................................ 296/98
See application file for complete search history.

(56) References Cited

U.S. PATENT DOCUMENTS

| 4,784,427 | A | * | 11/1988 | Burgess | ................... B60J 7/068 160/314 |
| 4,786,099 | A | * | 11/1988 | Mount | ...................... B60J 7/068 296/100.05 |
| 4,889,381 | A | * | 12/1989 | Tamblyn | .................. B60J 7/068 296/98 |
| 5,251,950 | A | * | 10/1993 | Bernardo | ................. B60J 7/041 296/100.03 |
| 2016/0031305 | A1 | * | 2/2016 | Bernardo | ................. B60J 7/196 296/100.03 |
| 2018/0118002 | A1 | * | 5/2018 | Koengeter | ............... B60J 7/196 |
| 2019/0193536 | A1 | * | 6/2019 | Pompili | ................. B60J 7/0573 |
| 2019/0389287 | A1 | * | 12/2019 | Pompili | ................... B60J 7/198 |
| 2020/0353803 | A1 | * | 11/2020 | Pompili | ................. B60J 7/0573 |
| 2021/0206246 | A1 | * | 7/2021 | Fowler | ..................... B60J 7/068 |

* cited by examiner

*Primary Examiner* — Jason S Morrow

(57) ABSTRACT

A transmission stretching truck box covering device with heating control, includes: a clutch-type drive gear box, wherein the drive of the transmission motor drives the electric roller shutter to operate, and the motor is communicatively connected to a roller shutter control board; an electric roller shutter, one end of which is connected to the clutch-type drive gear box, the other end of which is fixed in a driven bearing; a roller shutter cover, which stretches along the extension direction of a side rod; a side rod, which is a support frame in which the roller shutter cover stretches; wherein the inner side of the side rod is a guide rail in which the roller shutter cover stretches, and the outer side is attached to the two sidewalls of the open top cover in the truck box.

10 Claims, 3 Drawing Sheets

TRANSMISSION STRETCHING TRUCK BOX COVERING DEVICE WITH HEATING CONTROL

TECHNICAL FIELD

The disclosure relates to the technical field of transmission stretching, in particular to a transmission stretching truck box covering device with heating control.

BACKGROUND

A box is used to place and carry items, which provides great convenience for people's life. Generally, the box for placing the items is consisted of a box plate and a storage cavity surrounded by the box plate, which can be opened at the side for placing items, or can be opened at the top cover for placing items, or can be opened at the side and at the top cover for placing items. In recent years, with the development of automobiles, pickup trucks with open box compartments have become more and more popular. The pickup truck is a light duty vehicle in which a roofless container is provided behind the cab, and the side panels of the container are integrated with the cab. It is a passenger-cargo vehicle that looks like a car in the front and has a container at the back. At the same time, the carriage is covered by an electric tail box cover to protect the goods carried from the weather and theft. It is convenient for users to open and close the box cover. At the same time, the appearance of the pickup truck is more beautiful.

The environmental conditions in each region are different. When the electric roller shutter is used in rainy and snowy weather and low-temperature environmental conditions, such as in winter or in northern Europe and other regions, the water inside the side rod of the roller shutter will freeze. As a result, the roller shutter is frozen on the side rod and cannot slide, and eventually the product cannot be used.

Therefore, how to provide a convenient, fast, and stable transmission stretching box covering device that can defrost or remove ice and snow is a technical problem to be solved urgently by those skilled in the art.

SUMMARY

The disclosure provides a transmission stretching truck box covering device with heating control, so as to solve the technical solution that there is no convenient, fast, and stable transmission stretching box covering device that can defrost or remove ice and snow in the prior art.

The disclosure provides a transmission stretching truck box covering device with heating control, comprising: a clutch-type drive gear box, an electric roller shutter and a side rod;

wherein the clutch-type drive gear box is connected with a motor and the electric roller shutter, the drive of the transmission motor drives the electric roller shutter to operate, and the motor is communicatively connected to a roller shutter control board;

one end of the electric roller shutter is connected to the clutch-type drive gear box, and the other end of the electric roller shutter is fixed in a driven bearing; a roller shutter cover stretches along the extension direction of a side rod;

the side rod is a support frame in which the roller shutter cover stretches and is vertically located on both sides of the roller shutter cover; the inner side of the side rod is a guide rail in which the roller shutter cover stretches, and the outer side is attached to the two side walls of the open top cover in the truck box; further, a heating belt is provided in the side rod, which is connected with the heating control board and the power supply of the truck, and which starts or stops heating according to the instructions of the heating controller.

Preferably, the heating control board is connected to the roller shutter control board through RS485 communication.

Preferably, the roller shutter control board is connected to an external control terminal via Bluetooth or a mobile network.

Preferably, the external control terminal is a small program terminal embedded in an application program.

Preferably, the inner side of the side rod is provided with a guide rail groove, both sides of the roller shutter cover are located in the guide rail groove to stretch along the guide rail groove; and the heating belt is located in the groove wall of the guide rail groove.

Preferably, the clutch-type drive gear box comprises: a gear box housing, a drive gear, a transmission gear, and a clutch gear; the drive gear, the transmission gear and the clutch gear are located in the gear box housing;

the drive gear and the transmission gear are provided opposite to each other and form a clutch gear set with the clutch gear at a position perpendicular to the center line of the drive gear and the transmission gear.

Preferably, the clutch gear is sleeved and fixed on a center shaft, the center shaft is located at the center line of the drive gear and the transmission gear, one end of the center shaft is inserted into the center shaft mounting hole of the box housing of the clutch gear set, and the other end of the center shaft penetrates the center shaft adjusting hole on the opposite side of the center shaft mounting hole on the box housing, the center shaft is connected with the box housing through a screw thread at the side of the center shaft adjusting hole, and the center shaft is screwed and adjusted from the outside of the center shaft adjusting hole to move toward or away from the drive gear and the transmission gear.

Preferably, the gear box housing is surrounded by a side panel to form a gear housing cavity, and the gear box top cover is fixed to the top of the gear housing cavity by bolts in cooperation with nuts.

Preferably, the drive gear, the transmission gear and the clutch gear are sector gears, the sector gear surfaces are opposite to each other, and when the clutch gear is close to the drive gear and the transmission gear, the gears mesh with each other; when the clutch gear is far away from the drive gear and the transmission gear, the gears are released from meshing.

Preferably, a positioning baffle is provided between the clutch gear and the box housing on the center shaft, and the diameter of the positioning baffle is larger than the diameter of the center shaft adjusting hole.

The transmission stretching box covering device provided by the disclosure is simple in structure, low in production cost, and stable in performance, and improves market competitiveness. It is used as an electric roller shutter on a truck box, and an electrically controlled heating belt is added. Under freezing conditions, the electric roller shutter can still be used, and the operation is simple and convenient. It can be controlled through the application applet on a terminal such as a mobile phone or a preset button and a remote controller. In unexpected situations, rotating the intermediate shaft can realize the connection or disconnection of the power transmission between the transmission shaft gear and the roller shaft gear, which is convenient and quick to operate and is high in working efficiency.

BRIEF DESCRIPTION OF THE DRAWINGS

In order to explain the technical solutions of the embodiments of the disclosure more clearly, the drawings that need to be used in the description of the embodiments of the disclosure will be briefly introduced. Obviously, the drawings in the following description are only a part of the embodiments of the disclosure. For those skilled in the art, other drawings may be obtained based on these drawings without creative labor.

DESCRIPTION OF THE EMBODIMENTS

The technical solutions in the embodiments of the disclosure will be clearly and completely described in conjunction with the accompanying drawings in the embodiments of the disclosure. Obviously, the described embodiments are a part of the embodiments of the disclosure, rather than all of the embodiments. Based on the embodiments of the disclosure, all other embodiments obtained by those skilled in the art without creative work shall fall within the protection scope of the disclosure.

Figure 1:
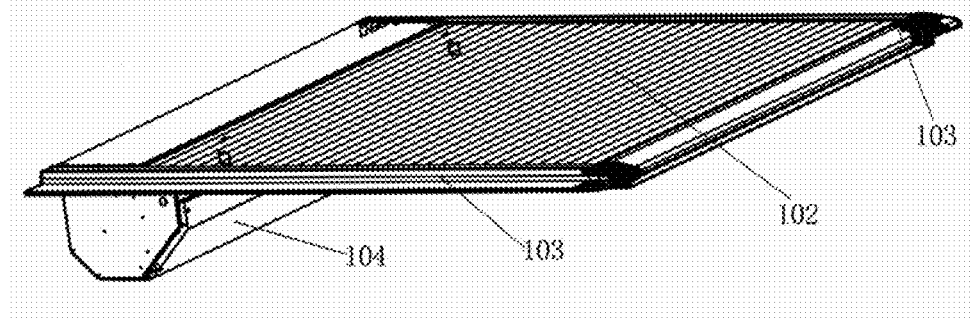
FIG. 1 is a schematic structural diagram of a transmission stretching truck box covering device according to an embodiment of the disclosure.
Figure 2:
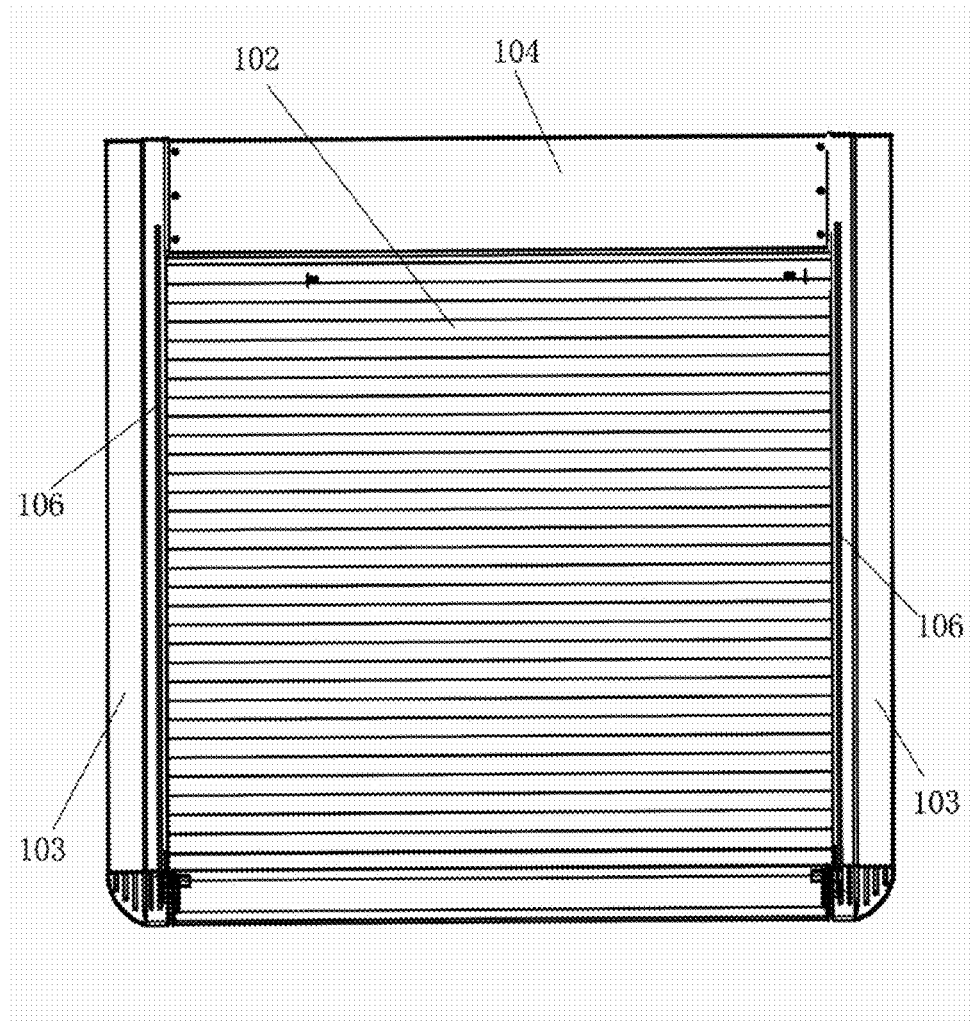
FIG. 2 is a schematic structural diagram of a transmission stretching truck box covering device with heating control according to an embodiment of the disclosure.
Figure 3:
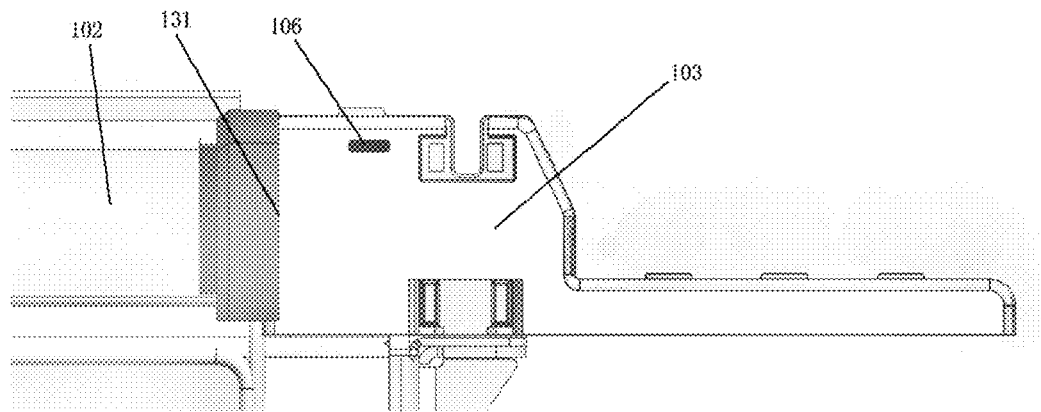
FIG. 3 is a schematic diagram of a disassembled structure of transmission stretching truck box covering device with heating control according to an embodiment of the disclosure.
Figure 4:
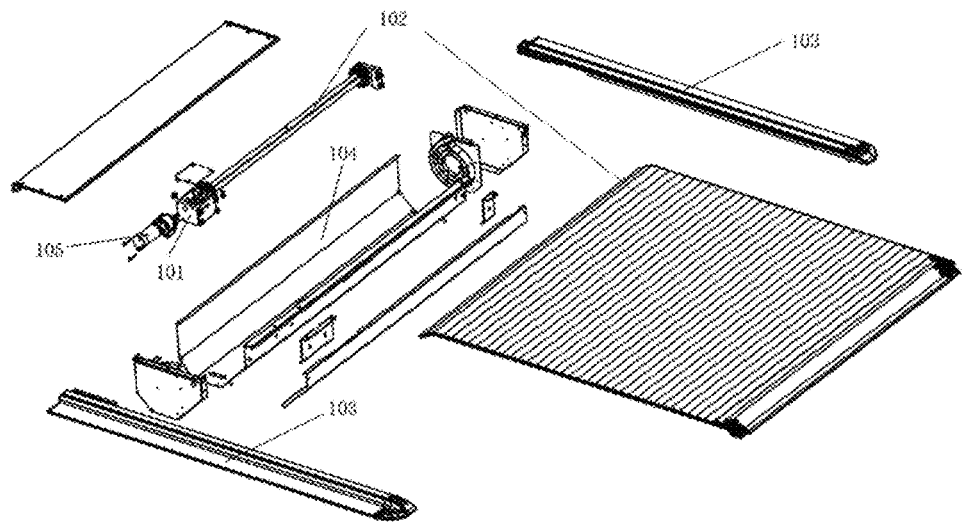
FIG. 4 is a schematic diagram of a cross-sectional view of a side rod equipped with a heating belt in a transmission stretching truck box covering device with heating control according to an embodiment of the disclosure.
Figure 5:
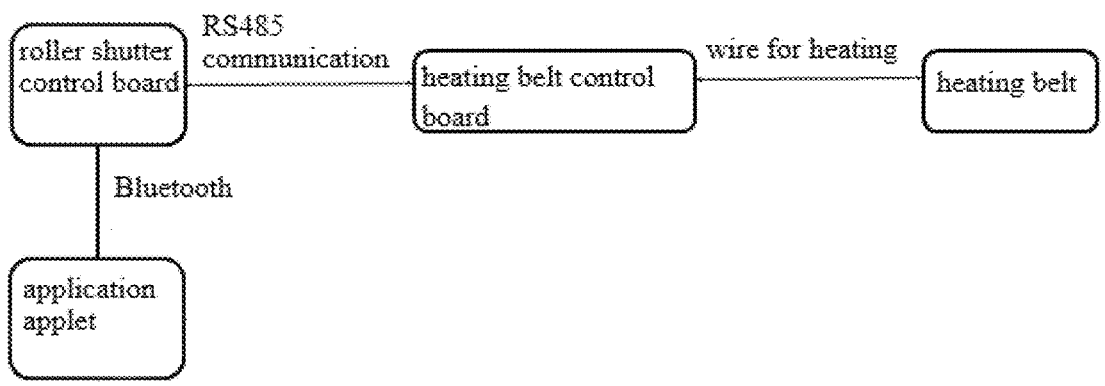
FIG. 5 is a schematic diagram of a heating belt control system in a transmission stretching truck box covering device with heating control according to an embodiment of the disclosure.
Figure 6:
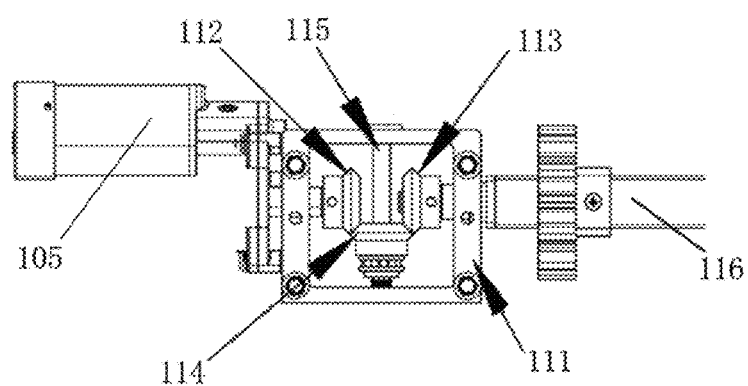
FIG. 6 is a schematic structural diagram of a clutch-type drive gear box in a transmission stretching truck box covering device with heating control according to an embodiment of the disclosure.

In this embodiment, a transmission stretching truck box covering device with heating control is provided. The controller is connected, and the electrical connection with the truck can electrically control the transmission stretching box cover on a truck box. The gear clutch can also be manually controlled to be on/off by external screwing so as to achieve manual control of the box cover. Specifically, as shown in FIGS. 1 to 6, FIG. 1 is a schematic structural diagram of a transmission stretching truck box covering device according to an embodiment of the disclosure; FIG. 2 is a schematic structural diagram of a transmission stretching truck box covering device with heating control according to an embodiment of the disclosure; FIG. 3 is a schematic diagram of a disassembled structure of transmission stretching truck box covering device with heating control according to an embodiment of the disclosure; FIG. 4 is a schematic diagram of a cross-sectional view of a side rod equipped with a heating belt in a transmission stretching truck box covering device with heating control according to an embodiment of the disclosure; FIG. 5 is a schematic diagram of a heating belt control system in a transmission stretching truck box covering device with heating control according to an embodiment of the disclosure; FIG. 6 is a schematic structural diagram of a clutch-type drive gear box in a transmission stretching truck box covering device with heating control according to an embodiment of the disclosure.

Specifically, the transmission stretching truck box covering device with heating control comprises: a clutch-type drive gear box 101, an electric roller shutter 102 and a side rod 103; the clutch-type drive gear box 101 is located in the housing 104 and is connected with a motor 105 and the electric roller shutter 102, the drive of the transmission motor drives the electric roller shutter to operate, and the motor is communicatively connected to a roller shutter control board.

One end of the electric roller shutter 102 is connected to the clutch-type drive gear box 101, and the other end of the electric roller shutter is fixed in a driven bearing; a roller shutter cover stretches along the extension direction of a side rod 103. The side rod 103 is a support frame in which the roller shutter cover stretches and is vertically located on both sides of the roller shutter cover; the inner side of the side rod is a guide rail 131 in which the roller shutter cover stretches, and the outer side is attached to the two side walls of the open top cover in the truck box.

Further, a heating belt 106 is provided in the side rod, which is connected with the heating control board and the power supply of the truck, and which starts or stops heating according to the instructions of the heating controller.

In some preferable embodiments, the heating control board is connected to the roller shutter control board through RS485 communication.

In some preferable embodiments, the roller shutter control board is connected to an external control terminal via Bluetooth or a mobile network. The external control terminal can be a smart terminal such as a mobile phone, a computer, or a tablet, or a remote control device such as an external remote controller.

In some preferable embodiments, the external control terminal is a small program terminal embedded in an application program.

In some preferable embodiments, the inner side of the side rod is provided with a guide rail groove, both sides of the roller shutter cover are located in the guide rail groove to stretch along the guide rail groove; and the heating belt is located in the groove wall of the guide rail groove.

In some preferable embodiments, the clutch-type drive gear box 101 comprises: a gear box housing 111, a drive gear 112, a transmission gear 113, and a clutch gear 114; the drive gear 112, the transmission gear 113 and the clutch gear 114 are located in the gear box housing 111. The drive gear 112 and the transmission gear 113 are provided opposite to each other and form a clutch gear set with the clutch gear 114 at a position perpendicular to the center line of the drive gear and the transmission gear. The transmission gear 113 is connected with the roller shutter shaft 116 of the electric roller shutter, and drives the roller shutter shaft 116 to move.

In some preferable embodiments, the clutch gear is sleeved and fixed on a center shaft 115, the center shaft is located at the center line of the drive gear and the transmission gear, one end of the center shaft is inserted into the center shaft mounting hole of the box housing of the clutch gear set, and the other end of the center shaft penetrates the center shaft adjusting hole on the opposite side of the center shaft mounting hole on the box housing, the center shaft is connected with the box housing through a screw thread at the side of the center shaft adjusting hole, and the center shaft is screwed and adjusted from the outside of the center shaft adjusting hole to move toward or away from the drive gear and the transmission gear.

In some preferable embodiments, the gear box housing is surrounded by a side panel to form a gear housing cavity, and the gear box top cover is fixed to the top of the gear housing cavity by bolts in cooperation with nuts.

In some preferable embodiments, the drive gear, the transmission gear and the clutch gear are sector gears, the sector gear surfaces are opposite to each other, and when the clutch gear is close to the drive gear and the transmission gear, the gears mesh with each other; when the clutch gear is far away from the drive gear and the transmission gear, the gears are released from meshing.

In some preferable embodiments, a positioning baffle is provided between the clutch gear and the box housing on the center shaft, and the diameter of the positioning baffle is larger than the diameter of the center shaft adjusting hole.

Preferably, the driven motor can be electrically connected to the controller, and the controller can receive wired or wireless control to drive the electric roller shutter to operate. Wireless control methods comprise: electric roller shutters only use "433M remote control key for control", but for this method, if the remote controller is damaged, lost, or out of power, the electric roller shutters will be unusable. At the same time, because the 433M frequency band is a public frequency band, many other civilian devices are in use (such as motorcycle keys, car keys, electric rolling gates, etc.), which are more susceptible to interference and result in signal instability. In this embodiment, in addition to supporting the existing method, the remote control for the transmission stretching box cover on the box also supports three other control methods.

The first method is a control embedded in the original car remote control key, especially on the vehicle box. Since the owner must carry the car key with him when using the car, the use of this control method greatly improves the convenience of using electric roller shutters, and can control the electric roller shutter without carrying any other additional devices.

The second method is a small program control. Because the popularizing rate of smart phones and the popularizing rate of social software are both very high, based on the social software platform, a small program control of electric roller shutters has been developed. A processor and a Bluetooth module are provided in the transmission controller. The data interaction of the small program and the background verifies the identity information of a user, the Bluetooth module of the transmission stretching box covering device is then connected, and the control message is received to remotely control the box cover. In this case, the smart phone is carried by the user to control the roller shutter, so as to realize the storage of user usage and device status data and big data analysis, which improves user experience and safety. The electric roller shutter controller is provided with a Bluetooth device. The user can use the mobile phone to control all the functions of the electric roller shutter and monitor the status through the small program software.

The third method is the additional button control, which is connected to the transmission controller through communication. This solution allows the user to operate the electric shutter switch at will without leaving the cab and needing to open the shutter.

The transmission clutch device changes the relative gap between the intermediate shaft gear and the motor shaft gear and the roller shutter shaft gear, thereby disconnecting or connecting the meshing transmission between the motor shaft gear and the roller shutter shaft gear. The electronically controlled heating belt is added. Under freezing conditions, the electric roller shutter can still be used, and the operation is simple and convenient. It can be controlled through the application applet on a terminal such as a mobile phone. It has the advantages of simple structure, quick operation, high operation efficiency, and can be realized without professional technicians and professional tools, which is conducive to popularization and use.

Those skilled in the art can clearly understand that for the convenience and conciseness of the description, only the division of the above functional units and modules is illustrated as an example. In practical applications, the above functions can be allocated to different functional units and modules as required. That is, the internal structure of the device is divided into different functional units or modules to complete all or part of the functions described above.

The above embodiments are only used to illustrate the technical solutions of the disclosure, rather than limiting the technical solutions; although the disclosure is described in detail with reference to the above embodiments, those skilled in the art should understand that the technical solutions recorded in the above embodiments can still be modified, or some of the technical features are equivalently replaced; and these modifications or replacements do not cause the essence of the corresponding technical solutions to deviate from the spirit and scope of the technical solutions of the embodiments of the disclosure, and should be included within the protection scope of the disclosure.

What is claimed is:

1. A transmission stretching truck box covering device with heating control, comprising: a clutch-type drive gear box, an electric roller shutter and a side rod;
   wherein the clutch-type drive gear box is connected with a motor and the electric roller shutter, the drive of the transmission motor drives the electric roller shutter to operate, and the motor is communicatively connected to a roller shutter control board;
   one end of the electric roller shutter is connected to the clutch-type drive gear box, and the other end of the electric roller shutter is fixed in a driven bearing; a roller shutter cover stretches along the extension direction of a side rod;
   the side rod is a support frame in which the roller shutter cover stretches and is vertically located on both sides of the roller shutter cover; an inner side of the side rod is a guide rail in which the roller shutter cover stretches, and an outer side of the side rod is attached to two side walls of the truck box; further,
   a heating belt is provided in the side rod, which is connected with a heating control board and a power supply of the truck, and which starts or stops heating according to instructions of the heating control board.

2. The transmission stretching truck box covering device with heating control according to claim 1, wherein the heating control board is connected to the roller shutter control board through RS485 communication.

3. The transmission stretching truck box covering device with heating control according to claim 1, wherein the roller shutter control board is connected to an external control terminal via a mobile network.

4. The transmission stretching truck box covering device with heating control according to claim 3, wherein the external control terminal is a small program terminal embedded in an application program.

5. The transmission stretching truck box covering device with heating control according to claim 1, wherein the inner side of the side rod is provided with a guide rail groove, both sides of the roller shutter cover are located in the guide rail groove to stretch along the guide rail groove; and the heating belt is located in the groove wall of the guide rail groove.

6. The transmission stretching truck box covering device with heating control according to claim 1, wherein the clutch-type drive gear box comprises: a gear box housing, a drive gear, a transmission gear, and a clutch gear; the drive gear, the transmission gear and the clutch gear are located in the gear box housing;

the drive gear and the transmission gear are provided opposite to each other and form a clutch gear set with the clutch gear at a position perpendicular to a center line of the drive gear and the transmission gear.

7. The transmission stretching truck box covering device with heating control according to claim 6, wherein the clutch gear is sleeved and fixed on a center shaft, the center shaft is located at the center line of the drive gear and the transmission gear, one end of the center shaft is inserted into a center shaft mounting hole of the gear box housing, and the other end of the center shaft penetrates a center shaft adjusting hole on the gear box housing opposite to the center shaft mounting hole, the center shaft is connected with the box housing through a screw thread at the side of the center shaft adjusting hole, and the center shaft is screwed and adjusted from the outside of the center shaft adjusting hole to move toward or away from the drive gear and the transmission gear.

8. The transmission stretching truck box covering device with heating control according to claim 7, wherein the gear box housing is surrounded by a side panel to form a gear housing cavity, and the gear box top cover is fixed to the top of the gear housing cavity by bolts in cooperation with nuts.

9. The transmission stretching truck box covering device with heating control according to claim 8, wherein the drive gear, the transmission gear and the clutch gear are sector gears, the sector gear surfaces are opposite to each other, and when the clutch gear is close to the drive gear and the transmission gear, the gears mesh with each other; when the clutch gear is far away from the drive gear and the transmission gear, the gears are released from meshing.

10. The transmission stretching truck box covering device with heating control according to claim 8, wherein a positioning baffle is provided between the clutch gear and the box housing on the center shaft, and the diameter of the positioning baffle is larger than the diameter of the center shaft adjusting hole.

\* \* \* \* \*